United States Patent
Yang et al.

(10) Patent No.: US 7,773,877 B2
(45) Date of Patent: Aug. 10, 2010

(54) METHOD FOR HANDLING CHANNEL FAILURES IN AN AUTOMATICALLY SWITCHED OPTICAL NETWORK

(75) Inventors: Yu Yang, Shenzhen (CN); Xianlong Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 11/955,776

(22) Filed: Dec. 13, 2007

(65) Prior Publication Data

US 2008/0124074 A1   May 29, 2008

Related U.S. Application Data

(63) Continuation of application No. PCT/CN2006/000317, filed on Mar. 3, 2006.

(30) Foreign Application Priority Data

Jun. 23, 2005   (CN) .......................... 2005 1 0077397

(51) Int. Cl.
*H04B 17/00*   (2006.01)
*H04B 10/08*   (2006.01)
*G02F 1/00*   (2006.01)
*G01R 31/08*   (2006.01)

(52) U.S. Cl. .............................. 398/10; 398/15; 398/5; 370/228

(58) Field of Classification Search ............. 398/10–15; 370/228
See application file for complete search history.

(56) References Cited

U.S. PATENT DOCUMENTS 4,449,247 A * 5/1984 Waschka, Jr. .................. 455/9

(Continued)

FOREIGN PATENT DOCUMENTS

CN   1424827   6/2003

(Continued)

OTHER PUBLICATIONS

Fang, L. et al. "LDP failure detection and recovery." IEEE Communications Magazine, Oct. 2004, vol. 42, No. 10: 117-123.*

(Continued)

*Primary Examiner*—Ken N Vanderpuye
*Assistant Examiner*—Danny W Leung
(74) *Attorney, Agent, or Firm*—Leydig, Voit & Mayer, Ltd.

(57) ABSTRACT

The present invention discloses a method for handling channel failures in an Automatically Switched Optical Network (ASON). When a channel alarm occurs, the head service node decides whether the channel alarm is incurred by a channel failure according to the alarm message or alarm information. If so, the head and end service nodes continue to locate whether the channel failure is inside or outside the network by combining local detection and message notification. If the channel failure is an internal failure, rerouting is activated to locate and remove the channel failure. When this method is used to locate a channel failure, the amount of information exchanged is small. The method may quickly identify the accurate position of a failure inside the network, improve the efficiency in removing failures, and minimize the damages to services, with little harm to equipment functioning and network performance.

7 Claims, 2 Drawing Sheets

U.S. PATENT DOCUMENTS

| | | | | |
|---|---|---|---|---|
| 4,899,043 | A * | 2/1990 | Mochizuki et al. | 356/432 |
| 5,189,674 | A * | 2/1993 | Shimizu | 714/712 |
| 5,296,956 | A * | 3/1994 | Fatehi et al. | 398/33 |
| 5,307,353 | A * | 4/1994 | Yamashita et al. | 714/4 |
| 5,436,750 | A * | 7/1995 | Kawano | 398/10 |
| 5,566,162 | A * | 10/1996 | Gruber et al. | 370/242 |
| 5,636,203 | A * | 6/1997 | Shah | 370/244 |
| 5,768,255 | A * | 6/1998 | Brownmiller et al. | 370/248 |
| 5,771,274 | A * | 6/1998 | Harris | 379/22.03 |
| 5,784,359 | A * | 7/1998 | Bencheck et al. | 370/244 |
| 5,832,196 | A * | 11/1998 | Croslin et al. | 714/4 |
| 5,943,146 | A * | 8/1999 | Harano | 398/31 |
| 6,044,064 | A * | 3/2000 | Brimmage et al. | 370/248 |
| 6,178,025 | B1 * | 1/2001 | Hardcastle et al. | 398/17 |
| 6,253,339 | B1 * | 6/2001 | Tse et al. | 714/47 |
| 6,278,689 | B1 * | 8/2001 | Afferton et al. | 370/223 |
| 6,414,940 | B1 * | 7/2002 | Shah et al. | 370/242 |
| 6,496,476 | B1 * | 12/2002 | Badt et al. | 370/228 |
| 6,507,561 | B1 * | 1/2003 | Baniewicz et al. | 370/216 |
| 6,785,473 | B1 * | 8/2004 | Sasaki et al. | 398/17 |
| 6,933,852 | B2 * | 8/2005 | Kitajima et al. | 340/635 |
| 6,963,995 | B2 * | 11/2005 | Fee | 714/4 |
| 7,113,699 | B1 * | 9/2006 | Bhate et al. | 398/15 |
| 7,142,505 | B2 * | 11/2006 | Chaudhuri | 370/225 |
| 7,155,123 | B2 * | 12/2006 | Levy et al. | 398/33 |
| 7,187,862 | B2 * | 3/2007 | Mahlab | 398/10 |
| 7,231,145 | B2 * | 6/2007 | Gerstel et al. | 398/17 |
| 7,489,642 | B2 * | 2/2009 | Smith et al. | 370/242 |
| 7,499,646 | B2 * | 3/2009 | Emongkonchai | 398/2 |
| 7,542,672 | B2 * | 6/2009 | Kakizaki et al. | 398/12 |
| 2002/0024690 | A1 * | 2/2002 | Iwaki et al. | 359/110 |
| 2003/0117961 | A1 * | 6/2003 | Chuah et al. | 370/242 |
| 2004/0047628 | A1 * | 3/2004 | Passier et al. | 398/15 |
| 2004/0120706 | A1 * | 6/2004 | Johnson et al. | 398/10 |
| 2004/0208547 | A1 * | 10/2004 | Sabat et al. | 398/50 |
| 2005/0074236 | A1 * | 4/2005 | Urimindi et al. | 398/12 |
| 2005/0091371 | A1 * | 4/2005 | Delegue et al. | 709/224 |
| 2005/0185954 | A1 * | 8/2005 | Sadananda et al. | 398/5 |
| 2006/0274645 | A1 * | 12/2006 | Bradford et al. | 370/216 |
| 2008/0124074 | A1 * | 5/2008 | Yang et al. | 398/10 |

FOREIGN PATENT DOCUMENTS

| | | |
|---|---|---|
| EP | 1422968 | 5/2004 |
| EP | 1463235 | 9/2004 |
| EP | 1489784 | 12/2004 |

OTHER PUBLICATIONS

R. Munoz, et al; "Experimental GMPLS fault management for OULSR transport networks" Optical Fiber Communication Conference, 2005. Technical Digest. OFC/NF OEC Anaheim, CA, USA Mar. 6-11, 2005, vol. 3, pp. 504-506, XP010831791.

Andrzej Jajszczyk, "Automatically Switched Optical Networks: Benefits and Requirements", IEEE Communications Magazine, IEEE Service Center, Piscataway, US, vol. 43, No. 2, Feb. 1, 2005, pp. S10-S15, XP011126662.

European Search Report- dated Oct. 8, 2008, Application No./Patent No. 06721993.1—2415/1903693 PCT/CN2006000317.

* cited by examiner

METHOD FOR HANDLING CHANNEL FAILURES IN AN AUTOMATICALLY SWITCHED OPTICAL NETWORK

CROSS-REFERENCES TO RELATED APPLICATIONS

The present application is a continuation of PCT Application No. PCT/CN2006/000317, filed on Mar. 3, 2006, which claims a priority to Chinese Patent Application No. 200510077397.5, filed on Jun. 23, 2005. All of these applications are incorporated herein by reference for all purposes.

FIELD OF THE INVENTION

The present invention relates to automatically switched optical network technologies, and in particular to a method for handling channel failures in an Automatically Switched Optical Network (ASON).

BACKGROUND OF THE INVENTION

Architecture for the Automatically Switched Optical Network (ASON) did not appear by accident. Its rise can be attributed to the strike of fast Internet development, the challenges facing operators in providing new value-added services, and the needs of exploring cost-effective networking in the future.

In recent years, information technologies are advancing rapidly, and data services, especially the demands for IP services, are in continuous explosive increase in the backbone network.

With the provision of rich and plentiful services, the requirement for service reliability becomes a primary concern of operators, who expect that services are free from the impact of network exceptions.

The self-healing capability of a network is the key to ensuring that services are not affected in the case of network exceptions. In a traditional network, the protection of services against network exceptions mainly relies on the protection switching of a ring network and the 1+1 or 1:n redundancy of services. The ASON has these traditional protection capabilities with the addition of a service recovery capability. This recovery means protection resources are not reserved in network planning and new services are reestablished only in the event of network exceptions. It can largely increase the efficiency of network resources. Various strategies like segment recovery and preset recovery can be adopted to raise the speed of recovery and minimize the damage to services.

Exceptions in a network come in various forms including fiber break, node failure, node power failure, transmission board failure, service transmission channel failure and node reset. These exceptions are unpredictable. They all require that the network itself is capable of handling upon their occurrence. For fiber breaks and node failures, the ASON has mature solutions. For channel failures, however, no mature solutions are available. Most devices take no action upon a channel (timeslot) alarm and services are in fact interrupted. Therefore, to reduce the impact on services, when an intelligent device suffers a channel failure, recovery means need to be adopted for services running on this channel.

The Link Management Protocol (LMP) provides a specialized link failure location mechanism. The mechanism is activated by a downstream node that detects a data link failure. It checks the link status hop by hop along the Label Switched Path (LSP) through the exchange of channel failure messages and response messages, until the failed link is located.

Based on the exchange of LMP messages including Channel Status, Channel Status ACK, Channel Status Request, and Channel Status Response and the indication of port failure status, this LMP failure handling process can locate a failed port in the ASON. Here, the channel is only specific to ports at present. After a failure is located, recovery methods like rerouting are applied to clear the failed link and protect services.

The prior art enables the location of internal channel failures in a network by extending the port level failure location method in LMP to channel level failure location.

The aforesaid solution, however, is implemented by the exchange of a large number of messages, which not only affects the speed and accuracy of failure location, results in low efficiency in clearing failures and leads to serious service damages, but also hinders the work capability of equipment and harms the network performance.

SUMMARY OF THE INVENTION

The present invention provides a method for handling channel failures in the ASON, which can locate a failed channel in a rapid and accurate manner and activate the rerouting mechanism to recover services. Damages to services and network performance can thus be minimized.

The method for handling channel failures in the ASON includes:

A. The head node decides, upon occurrence of a channel alarm, that the channel alarm is incurred by a channel failure according to alarm information or alarm messages.

B. The head node and end node determine that the channel failure comes from inside the network by combining local detection and message notification.

C. The head node initiates a process, which involves no cross configuration, to build a rerouting path identical with the original path to locate the link that causes the channel failure.

Further, after step C, the method includes:

D. When the link causing the channel failure is located, the downstream node sends a reroute failure message to the head node, which contains the link failure information corresponding to the failed channel.

E. The head node initiates a second rerouting process upon reception of the link failure information to remove the located channel failure on condition that the failed link is cleared.

Step A further includes:

A1. When a node detects a channel alarm, the node sends an alarm message to the head node.

A2. The head node decides whether the channel alarm is incurred by a channel failure according to the type and contents of the alarm information it detects or the alarm messages it receives.

Step A2 further includes:

When the head node detects alarm information, if the alarm information and the received alarm messages all indicate a channel alarm, and the alarm information and the information contained in the alarm messages match, the head node determines that the channel alarm is incurred by a channel failure.

When the head node detects no alarm information, but the received alarm messages all indicate a channel alarm, and the information contained in the alarm messages matches, the head node determines that the channel alarm is incurred by a channel failure.

Step B further includes:

B1. After determining that the channel alarm is incurred by a channel failure, the head and end nodes check the channel alarm information at the forward ingress and reverse ingress respectively.

B2. The end node sends a message to the head node, notifying the detected channel alarm information.

B3. The head node decides whether the channel failure occurs inside the network according to the channel alarm information it detects and the channel alarm message sent by the end node.

Step B3 further includes:

If the head node detects no channel alarm information at the forward ingress but receives a channel alarm message regarding the forward ingress sent by the end node within a predefined period of time, the head node determines that the channel failure occurs inside the network.

If the head node detects channel alarm information at the reverse ingress and receives no channel alarm message sent by the end node within a predefined period of time, the head node determines that the channel failure occurs inside the network.

Step C further includes:

C1. The channel alarm information detected or received by the head node is carried in signaling to the downstream nodes in sequence. The alarm information at the ingress of the nodes is compared with the channel alarm information carried in signaling and the position of the channel failure inside the network is identified according to the comparison.

Step C1 further includes:

C11. If the internal channel failure comes from a transmit fiber, alarm detection and information comparison are performed at the forward ingress of the nodes one by one.

C12. If no channel alarm information is detected at the forward ingress of a node or the detected channel alarm information does not match the channel alarm information carried in signaling, while at a downstream node, channel alarm information is detected at the forward ingress and the detected channel alarm information matches the channel alarm information carried in signaling, the link between the two nodes is considered to be exceptional and the internal channel failure comes from this link.

Step C1 further includes:

C13. If the internal channel failure comes from a receive fiber, alarm detection and information comparison are performed at the reverse ingress of the nodes one by one.

C14. If channel alarm information is detected at the reverse ingress of a node and the detected channel alarm information matches the channel alarm information carried in signaling, while at a downstream node, no channel alarm information is detected at the reverse ingress or the detected channel alarm information does not match the channel alarm information carried in signaling, the link between the two nodes is considered to be exceptional and the internal channel failure comes from this link.

The signaling means signaling messages based on the Resource Reservation Protocol (RSVP).

In addition, if a subnet is embedded in the middle of a link, the channel failure location process regards the subnet as a link made up of head and end nodes.

The method provided by embodiments of the present invention offers many benefits. When it is used to locate a channel failure, the amount of information exchanged is small. The method increases the speed and accuracy in locating channel failures. The efficiency in removing failures is improved. The damages to services are minimized. There is little harm to network performance.

DETAILED DESCRIPTION OF THE INVENTION

According to an embodiment of the present invention, when a channel alarm is generated, the head service node decides whether the channel alarm is incurred by a channel failure. If no, the alarm is handled as an ordinary port alarm. If yes, the process continues to decide the channel failure occurs inside or outside the network. In the case of an external failure, the process is ended. Otherwise, the process continues to locate and remove the failure.

The head and end service nodes decide a channel failure comes from inside or outside the network by combining local detection and message notification and use rerouting to locate and remove an internal channel failure.

Embodiments of the present invention will be described in detail with reference to the attached drawings.

Figure 1:
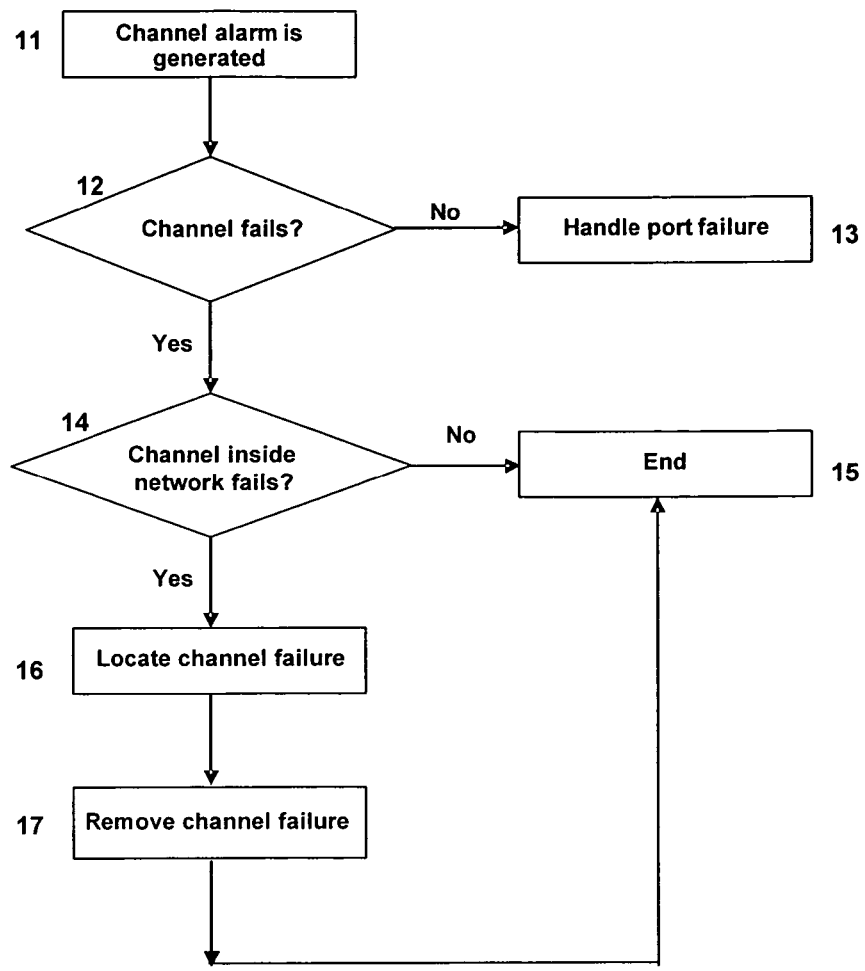
FIG. 1 is a flowchart of the method for handling channel failures according to an embodiment of the invention.

FIG. 1 shows the procedure of the implementation according to an embodiment of the present invention, which includes:

Step 11: A channel alarm is generated.

When a failure occurs in the ASON, no matter it is a port failure or channel failure, a channel alarm is generated.

Step 12: Decide whether the channel alarm is incurred by a channel failure.

When a channel alarm is generated, the head service node decides whether the channel alarm is incurred by a channel failure. If no, it proceeds to step 13 and handles the alarm as an ordinary port alarm. If yes, proceed to step 14 to determine the channel failure occurs inside or outside the network.

In practice, nodes in a network detect the work status of fibers between the nodes all the time. Once a failure occurs, a node detects alarm information and sends a relevant alarm message to the head node.

For instance, when a fiber breaks at the forward ingress of a node, which results in a port failure, this node will detect port alarm information at the ingress. Meanwhile, the downstream nodes will detect channel alarm information. The nodes all send messages to the head node, notifying the detected alarm information.

For instance, when a channel fails at the forward ingress of a node, this node will detect channel alarm information at the ingress. Meanwhile, the downstream nodes will also detect channel alarm information. The nodes all send messages to the head node, notifying the detected alarm information.

Therefore, the head node can decide whether the channel alarm is caused by a channel failure or port failure according to the type and contents of the alarm information detected or the alarm messages received.

When the head node detects alarm information, if the alarm information and received alarm messages include both port and channel alarms, and the alarm information and the information contained in the alarm messages match, the head node determines that the channel alarm is incurred by a port failure.

If the head node detects no alarm information but the received alarm messages include both port and channel alarms, and the information contained in the alarm messages match, the head node determines that the channel alarm is incurred by a port failure.

When the head node detects alarm information, if the alarm information and the received alarm messages all indicate a channel alarm, and the alarm information matches the information contained in the alarm messages, the head node determines that the channel alarm is incurred by a channel failure.

If the head node detects no alarm information, but the received alarm messages all indicate a channel alarm, and the information contained in the alarm messages match, the head node determines that the channel alarm is incurred by a channel failure.

Step 13: Handle port failure.

If the channel alarm is caused by a port failure, the prior art is adopted to handle the port failure.

Step 14: Decide whether the channel failure comes from inside the network.

If it is determined that the channel alarm results from a channel failure, the head and end service nodes continue to decide the failure is located inside or outside the network by combining local detection and message notification.

According to the embodiment, the head and end nodes decide the failure is located inside or outside the network in the following way:

If a channel failure is determined, the head node checks channel alarms from outside the network at the forward ingress. If such a channel alarm is detected, the head node regards the channel failure occurs in the external network and does not continue to locate or remove the failure. Otherwise, the head node continues to check the alarm status at the reverse ingress.

If an alarm is detected at the reverse ingress, the head node waits for the message notification from the end node which checks external alarms.

If the head node does not receive a message notifying an external alarm from the end node within a predefined period of time, the head node regards that the channel failure originates from the receiving fiber inside the network. Then proceed to step 16 to further locate the failure.

If the head node receives a message from the end node notifying an external alarm within the predefined period of time, the head node regards that the channel failure originates from outside the network. Then proceed to step 15 and end the process.

When the head node detects channel alarms, the end node checks channel alarms simultaneously. The end node first checks channel alarms at the reverse ingress. If a channel alarm is detected, the end node sends a message to the head node to notify the external alarm information and determines that the channel failure comes from outside the network. Then proceed to step 15 and ends the process.

If the end node detects no channel alarm at the reverse ingress, it sends no message notification and continues to check channel alarms at the forward ingress. If a channel alarm is detected at the forward ingress, the end node sends a message to the head node to notify the internal alarm information and determines that the channel failure originates from the transmitting fiber inside the network. Then proceed to step 16 to further locate the channel failure.

Step 15: End the process.

If it is determined that the channel failure originates from outside the network, the process of locating and removing the failure according to the present embodiment is ended.

Step 16: Identify the specific position of the internal channel failure.

If it is determined that the channel failure originates from inside the network, the head service node initiates a process to build a rerouting path identical with the original path. This process is intended to locate the failure and involves no cross configuration. When the link causing the channel failure is located, the downstream node sends a reroute failure message containing the link and node information corresponding to the failed channel to the head node.

According to the embodiment, rerouting is used to locate an internal channel failure in the following way:

The channel alarm information detected or received by the head node is carried in signaling to the downstream nodes in sequence. The alarm information at the ingress of the nodes is compared with the channel alarm information carried in signaling and the position of the channel failure inside the network is identified according to the comparison.

If the channel failure originates from the transmitting fiber, the signaling first carries the channel alarm information detected or received by the head service node to the second node and checks the alarm status at the forward ingress of this node, and then compares the alarm information detected at this node with the channel alarm information detected or received by the head service node, specifically, the channel alarm information carried in signaling.

If a channel alarm is detected at the forward ingress of this node and the alarm information matches that carried in signaling, the channel failure is then located between the head node and the second node.

If no channel alarm is detected at the forward ingress of the second node, or there is a channel alarm but the alarm information does not match that carried in signaling, the link between the head node and the second node is regarded as normal. Then the signaling carries the channel alarm information detected or received by the head service node to the third node. The same procedure is repeated until the specific position of the failure is identified.

If the channel failure comes from a receiving fiber, alarm detection and information comparison are performed at the reverse ingress of the service nodes one by one. If a channel alarm is detected at the reverse ingress of an upstream node and a downstream node and the alarm information matches the channel alarm information carried in signaling, the link between the two nodes is normal. If the alarm information at the upstream node matches the channel alarm information of the head node while no alarm information is detected at the downstream node, or alarm information is detected but does not match the channel alarm information of the head node, the link between the upstream node and the downstream node is abnormal. And the channel failure comes from this link.

When the channel failure is located between two nodes, a reroute failure message is sent to the head node. This message includes the link and node information corresponding to the channel failure, indicating the failed link.

The signaling means signaling messages based on the Resource Reservation Protocol (RSVP).

In the location process, if a subnet is embedded in a link, such as a virtual ring or other protection ring, this subnet is regarded as a link made up of head and end nodes.

Step 17: Remove the channel failure.

When the channel failure is located, the head node initiates a second rerouting according to the failed link information and removes the failed link. After the failed link is removed and the rerouting succeeds, services are recovered. The process of handling channel failure is ended.

After a channel failure is located and removed in the above process, if the head node detects another channel alarm, another channel failure occurs to the ongoing service. In this case, the process is restarted to locate and remove this failure until all channel failures in the network are located and removed. Service recovery can thus be achieved.

Figure 2:
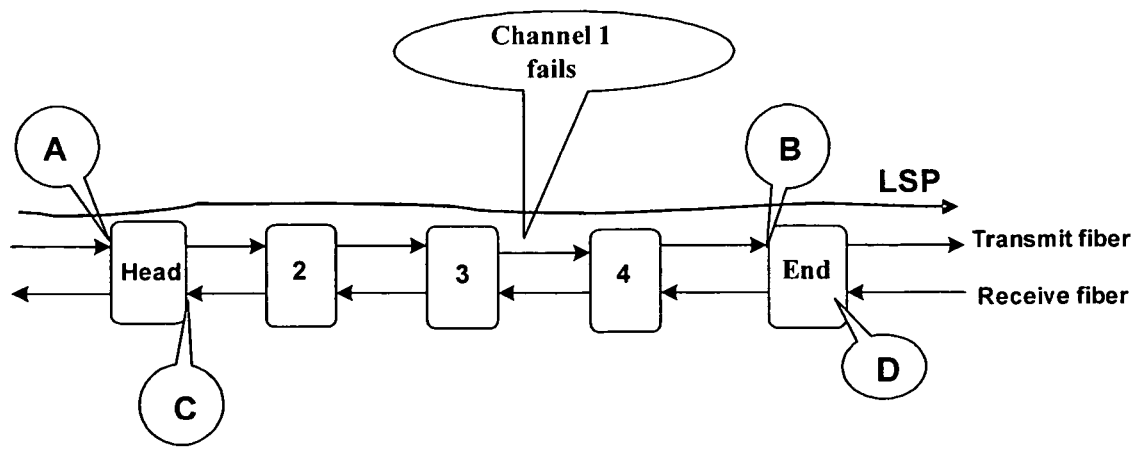
FIG. 2 is a diagram showing the structure of an ASON where a channel failure occurs.
Figure 3:
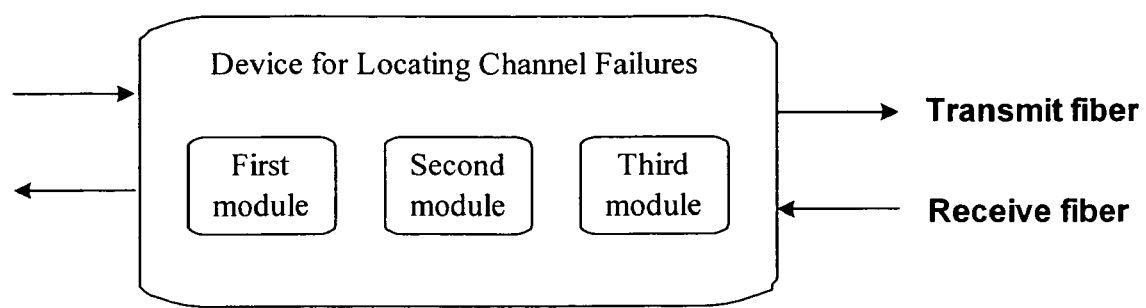
FIG. 3 is a diagram showing the structure of a node according to an embodiment of the invention.

With reference to FIG. 2, the following elaborates the application of the method according to an embodiment of the invention.

As shown in FIG. 2, an ASON includes a transmitting fiber and a receiving fiber. A Label Switched Path (LSP) exists along all nodes from the head node to the end node. Channel 1 fails in the link between node 3 and node 4 of the transmitting fiber. Services running on the LSP are interrupted. The failure of channel 1 is handled as follows.

When channel 1 fails between node 3 and node 4 and a channel alarm is generated, the head node decides whether the alarm is incurred by a channel failure according to the above step 12.

Because this alarm is caused by a channel failure, the head service node will not receive port alarm messages from other nodes but receive channel alarm messages from node 4 and the end node. The alarm information in the two alarm messages match. Thus the head node determines that the alarm is not the result of a port failure but a channel failure.

Then the head node continues to decide the channel failure is located inside or outside the network according to the above step 14.

The head node checks the channel alarm status at the forward ingress A and the reverse ingress C and finds no channel alarm at ingress A or C. In the meantime, the end node checks the alarm status at the forward ingress B and the reverse ingress D and detects an alarm of channel 1 at ingress B. Then the end node sends a message to the head node, notifying the alarm information. Because no alarm exists at the forward ingress A, and a channel alarm exists at the forward ingress B, the head node determines that the channel failure comes from inside the network.

Finally, the head node initiates a process to locate and remove the failure.

According to the above step 16, the head node initiates a process to build a rerouting path identical with the original path to locate the failure. This process involves no cross configuration. The detailed process is as below.

The alarm information of ingress B sent by the end node is carried in RSVP signaling to node 2. The alarm status at the forward ingress of node 2 is checked and compared with the alarm information carried in RSVP signaling. Because no alarm exists at the forward ingress of node 2, the link between the head node and node 2 is normal.

The alarm information is further carried to node 3 by RSVP signaling. The alarm status at the forward ingress of node 3 is checked and the alarm information is compared. Because no alarm exists at the forward ingress of node 3, the link between node 2 and node 3 is normal.

Then the alarm information is carried to node 4 by RSVP signaling. The alarm status at the forward ingress of node 4 is checked and the alarm information is compared. An alarm of channel 1 is detected at node 4 and the alarm information matches that carried in RSVP signaling. It is determined that the channel failure comes from the link between node 3 and node 4. Then an RSVP error message is returned to the head node, indicating reroute failure. This message includes the link and node information corresponding to channel 1, indicating the failed link.

After the position of the channel failure is identified, the head node initiates another rerouting according to the above step 17 and removes the failed link. After the rerouting succeeds, services are recovered.

With this method, the accurate position of a channel failure can be quickly identified; the efficiency in removing failures is improved, the damages to services are minimized; there is little harm to equipment functioning and network performance.

The present invention has been illustrated and described with reference to some preferred embodiments, but the invention is not limited to these embodiments. Those skilled in the art should recognize that various variations and modifications can be made without departing from the spirit of the present invention. The invention is intended to cover these variations and modifications provided that they fall into the scope of protection defined by the following claims.

What is claimed is:

1. A method for locating channel failures in an Automatically Switched Optical Network, comprising:
    determining that a channel alarm is incurred by a channel failure according to alarm information or alarm messages;
    after determining that the channel alarm is incurred by the channel failure, a head node and an end node checking channel alarm information at a forward ingress and a reverse ingress, respectively;
    the end node sending a channel alarm message to notify the head node of the channel alarm information detected;
    the head node deciding the channel failure occurs inside the network according to the channel alarm information detected and the channel alarm message sent by the end node; wherein
    if the head node detects no channel alarm information at the forward ingress of the head node, but receives the channel alarm message sent by the end node within a predefined period of time, the head node determining that the channel failure occurs inside the network;
    if the head node detects channel alarm information at the reverse ingress of the head node and receives no the channel alarm message sent by the end node within the predefined period of time, the head node determining that the channel failure occurs inside the network;
    the head node transmitting the channel alarm information detected or received in signaling along an original path to a downstream node in sequence, comparing alarm information detected at an ingress with the channel alarm information carried in signaling, and identifying the position of the channel failure in the fiber inside the network according to a comparison result.

2. The method of claim 1, wherein the determining that a channel alarm is incurred by a channel failure according to alarm information or alarm messages comprises:
    when detecting the channel alarm, sending by a node an alarm message to the head node;
    deciding by the head node the channel alarm is incurred by a channel failure according to types and contents of the alarm information detected at the head node or the alarm message received by the head node from the node.

3. The method of claim 2, wherein the deciding by the head node the channel alarm is incurred by a channel failure according to types and contents of the alarm information detected at the head node or the alarm message received by the head node from the node comprises:
    when detecting the alarm information, if both of the alarm information and the alarm messages received indicate a channel alarm, and the alarm information matches information contained in the alarm messages, determining that the channel alarm is incurred by a channel failure;

when detecting no alarm information, but each of the alarm messages received indicates a channel alarm, and the information contained in the alarm messages matches with each other, determining that the channel alarm is incurred by a channel failure.

4. The method of claim 1, wherein the transmitting the channel alarm information detected or received by the head node in signaling to downstream nodes in sequence, detecting and comparing the alarm information at the ingress of the downstream nodes with the channel alarm information carried in signaling, and identifying position of the channel failure inside the network according to the comparison result comprises:

if the channel failure comes from a transmitting fiber, performing an alarm detection and an information comparison at forward ingresses of nodes one by one;

if no channel alarm information is detected at a forward ingress of a node or the channel alarm information detected does not match the channel alarm information carried in signaling, while at a downstream node, the channel alarm information is detected at the forward ingress and the channel alarm information detected matches the channel alarm information carried in signaling, determining that link between the two nodes is abnormal and that the channel failure comes from the link.

5. The method of claim 1, wherein the transmitting the channel alarm information detected or received by the head node in signaling to downstream nodes in sequence, detecting and comparing the alarm information at the ingress of the downstream nodes with the channel alarm information carried in signaling, and identifying position of the channel failure inside the network according to the comparison result further comprises:

if the channel failure comes from a receiving fiber, performing an alarm detection and an information comparison at the reverse ingresses of nodes one by one;

if channel alarm information is detected at a reverse ingress of a node and the detected channel alarm information matches the channel alarm information carried in signaling, while at a downstream node, no channel alarm information is detected at the reverse ingress or the detected channel alarm information does not match the channel alarm information carried in signaling, determining that link between the two nodes is abnormal and that the channel failure comes from the link.

6. The method of claim 1, wherein the signaling means signaling messages based on the Resource Reservation Protocol (RSVP).

7. The method of claim 1, wherein if a subnet is embedded in the middle of a link, the subnet is regarded as a link made up of a head node and a end node in locating the channel failure.

\* \* \* \* \*